US012606383B2

(12) United States Patent
Kitaoka et al.

(10) Patent No.: US 12,606,383 B2
(45) Date of Patent: Apr. 21, 2026

(54) ARTICLE CONVEYANCE DEVICE

(71) Applicant: DAIFUKU CO., LTD., Osaka (JP)

(72) Inventors: Takeyoshi Kitaoka, Shiga (JP);
Kiyohiro Tominaga, Shiga (JP)

(73) Assignee: DAIFUKU CO., LTD., Osaka (JP)

( * ) Notice: Subject to any disclaimer, the term of this
patent is extended or adjusted under 35
U.S.C. 154(b) by 28 days.

(21) Appl. No.: 18/766,728

(22) Filed: Jul. 9, 2024

(65) Prior Publication Data

US 2025/0042667 A1 Feb. 6, 2025

(30) Foreign Application Priority Data

Aug. 1, 2023 (JP) ................................. 2023-125763

(51) Int. Cl.
*B66F 7/02* (2006.01)
*B65G 15/14* (2006.01)
*B65G 15/58* (2006.01)
*B65G 37/00* (2006.01)

(52) U.S. Cl.
CPC ........... *B65G 37/005* (2013.01); *B65G 15/14*
(2013.01); *B65G 15/58* (2013.01); *B65G*
*2207/14* (2013.01)

(58) Field of Classification Search
CPC ........... B65G 15/14; B65G 15/58; B66F 7/02;
B66B 7/062; B66B 17/12
USPC ......................................... 198/726; 187/404
See application file for complete search history.

(56) References Cited

U.S. PATENT DOCUMENTS

| | | | |
|---|---|---|---|
| 6,264,579 B1 | 7/2001 | Odai et al. | |
| 8,925,689 B2 * | 1/2015 | Jacobs | B66B 9/00 |
| | | | 187/404 |
| 9,643,817 B2 * | 5/2017 | Räsänen | B66B 11/008 |
| 10,059,565 B2 * | 8/2018 | Alasentie | B66B 11/009 |
| 2015/0158702 A1 * | 6/2015 | Dudde et al. | |
| 2015/0323122 A1 * | 11/2015 | Gardner | |

FOREIGN PATENT DOCUMENTS

| | | | | |
|---|---|---|---|---|
| FR | 2806396 A1 * | 9/2001 | ........... | B65G 37/005 |
| JP | 2-26685 U | 2/1990 | | |
| JP | 2000-044012 A | 2/2000 | | |
| JP | 3386724 B2 | 3/2003 | | |
| JP | 2014-97858 A | 5/2014 | | |
| JP | 2021-054621 A | 4/2021 | | |
| WO | WO-03070618 A1 * | 8/2003 | ............. | B67B 1/005 |

* cited by examiner

*Primary Examiner* — Douglas A Hess
(74) *Attorney, Agent, or Firm* — Harness, Dickey &
Pierce, P.L.C.

(57) ABSTRACT

Provided is an article conveyance device that makes it
possible to reduce production of particles. The article con-
veyance device includes: an ascending and descending stage
movable along a support pillar; a toothed belt stretched from
the ascending and descending stage along the support pillar;
a first pulley provided on one side with respect to the
ascending and descending stage in an up-and-down direc-
tion; a second pulley provided on the other side; and a drive
device that drives the first pulley to rotate, the second pulley
being a flat pulley.

2 Claims, 3 Drawing Sheets

LEFT ←→ RIGHT

DOWN 41          30, 31

ARTICLE CONVEYANCE DEVICE

CROSS REFERENCE TO RELATED APPLICATIONS

This Nonprovisional application claims priority under 35 U.S.C. § 119 on Patent Application No. 2023-125763 filed in Japan on Aug. 1, 2023, the entire contents of which are hereby incorporated by reference.

TECHNICAL FIELD

The present invention relates to a conveyance device that conveys an article.

BACKGROUND ART

Patent Literature 1 discloses an article conveyance device that conveys an article. The article conveyance device is configured such that an ascending and descending stage that is movable up and down by being guided by four raising and lowering guide masts is suspended and supported by four cord-like bodies. Toothed belts, which serve as the four cord-like bodies, are wound around (i) respective toothed pulleys which are each individually provided at an upper end part of a corresponding one of the raising and lowering guide masts and configured as a driven rotator and (ii) respective toothed pulleys which are each individually provided at a lower end part of a corresponding one of the raising and lowering guide masts and driven by a raising and lowering drive device.

CITATION LIST

Patent Literature

Japanese Patent Application Publication Tokukai No. 2014-97858

SUMMARY OF INVENTION

Technical Problem

The inventor of the present invention has revealed that such an article conveyance device has a problem that, as driving time increases, the toothed belts become worn to generate particles of a material of the toothed belts.

It is an object of an aspect of the present invention to provide an article conveyance device that makes it possible to reduce generation of particles.

Solution to Problem

In order to attain the object, an article conveyance device in accordance with an aspect of the present invention is an article conveyance device, including: a support pillar having a longitudinal direction corresponding to an up-and-down direction; an ascending and descending stage provided so as to be movable in the up-and-down direction along the support pillar; a toothed belt stretched from the ascending and descending stage both upward and downward along the support pillar; a first pulley provided to the support pillar on one side with respect to the ascending and descending stage in the up-and-down direction, the toothed belt being wound around the first pulley; a second pulley provided to the support pillar on the other side with respect to the ascending and descending stage in the up-and-down direction, the toothed belt being wound around the second pulley; and a drive device that drives the first pulley to rotate, the first pulley being a toothed pulley that meshes with the toothed belt, the second pulley being a flat pulley.

Advantageous Effects of Invention

According to the article conveyance device in accordance with an aspect of the present invention, it is possible to reduce generation of particles.

BRIEF DESCRIPTION OF DRAWINGS

FIG. 1 is a front view schematically illustrating an article conveyance device in accordance with Embodiment 1.

DESCRIPTION OF EMBODIMENTS

Embodiment 1

Figure 2:
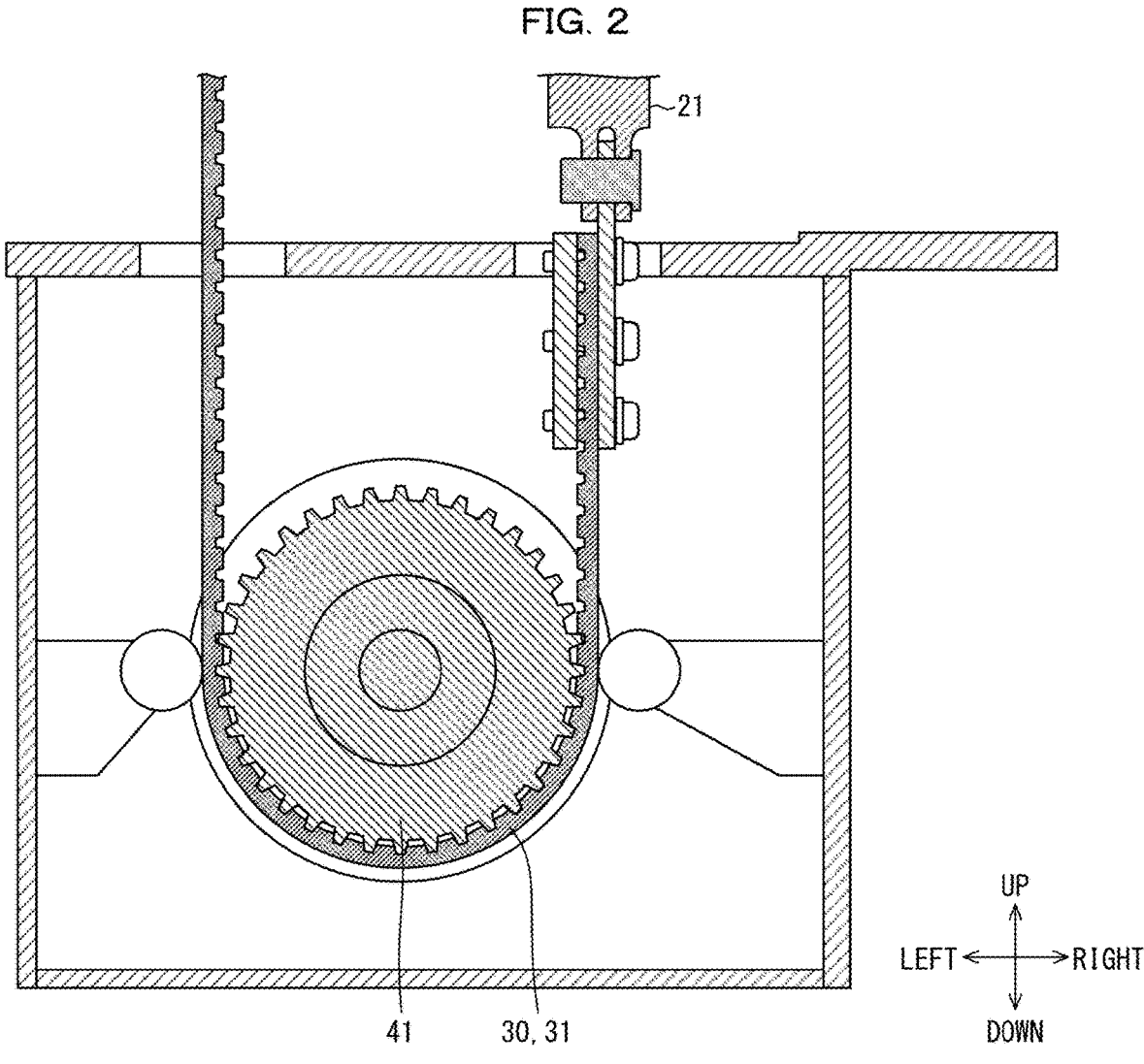
FIG. 2 is a cross-sectional view of the vicinity of a first pulley.

The following description will discuss details of an embodiment of the present invention. In the description below, for convenience of description, an up-and-down direction and a right-and-left direction are defined as indicated by arrows in FIG. 1, etc. In the present embodiment, the up-and-down direction corresponds to a vertical direction. The right-and-left direction is a direction orthogonal to the up-and-down direction. The expression "A to B", representing a numerical range, means "not less than A and not more than B" unless otherwise specified.

Figure 1:
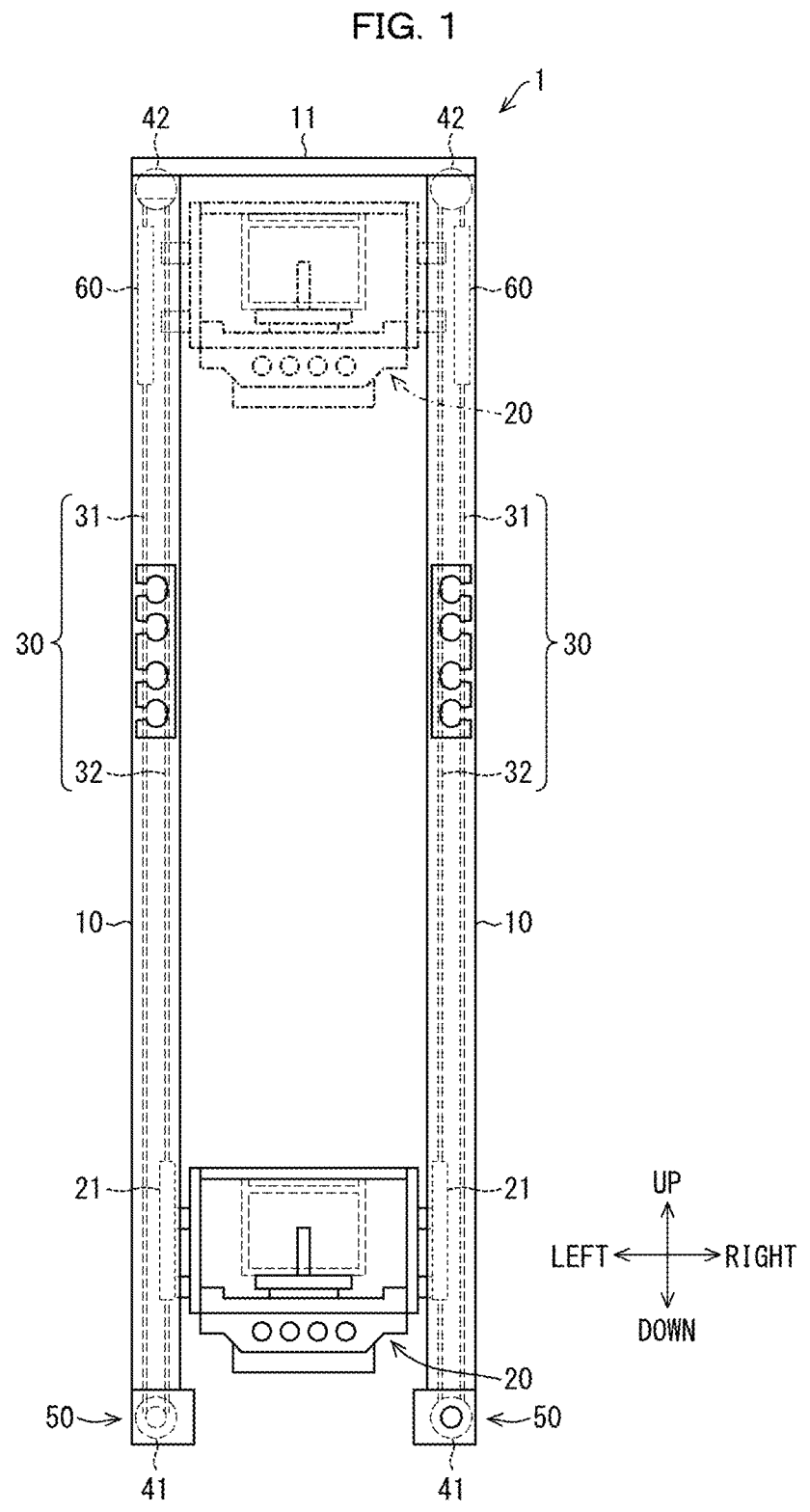

FIG. 1 is a front view schematically illustrating an article conveyance device 1 in accordance with Embodiment 1. The article conveyance device 1 is a device which conveys a conveyance target in the up-and-down direction. Specifically, the article conveyance device 1 can be: a device that is provided to a rack or in an automated warehouse and raises and lowers an article; or a stacker crane installed in an automated warehouse. As illustrated in FIG. 1, the article conveyance device 1 includes a support pillar 10, an ascending and descending stage 20, a toothed belt 30, a first pulley 41, a second pulley 42, a drive device 50, and a counter weight 60. Further, the article conveyance device 1 includes a known configuration (not illustrated) for controlling raising and lowering of the ascending and descending stage 20.

The support pillar 10 is a columnar member having a longitudinal direction corresponding to the up-and-down direction in a state where the article conveyance device 1 is in use. The article conveyance device 1 includes two such support pillars 10. The two support pillars 10 are spaced apart from each other in the right-and-left direction. Note, however, that the number of support pillars 10 included in the article conveyance device 1 is not limited to two. To an upper part of the two support pillars 10, an upper frame 11 is provided. The upper frame 11 is provided so as to connect upper ends of the respective support pillars 10 to each other.

The ascending and descending stage 20 is a member on which a conveyance target to be conveyed by the article conveyance device 1 is placed. The ascending and descending stage 20 is located between the two support pillars 10. The ascending and descending stage 20 is provided so as to be movable in the up-and-down direction along the support pillars 10. In FIG. 1, the ascending and descending stage 20 located at a lower part in a range within which the ascending and descending stage 20 is movable is indicated with solid lines. Also in FIG. 1, the ascending and descending stage 20 located at an upper part in the range within which the ascending and descending stage 20 is movable is indicated with dot-dash lines.

The toothed belt 30 is stretched from the ascending and descending stage 20 both upward and downward along each support pillar 10. Specifically, the ascending and descending stage 20 includes an ascending and descending frame 21 at each of both side parts of the ascending and descending stage 20 in the right-and-left direction. The ascending and descending frame 21 has structures respectively at an upper part and a lower part thereof, each of which structures can sandwich an end part of the toothed belt 30. The toothed belt 30 having end parts thereof sandwiched by the ascending and descending frame 21 is stretched both upward and downward. The toothed belt 30 is provided to each of the two support pillars 10. The toothed belt 30 is driven around each of the support pillars 10, so that the ascending and descending stage 20 ascends and descends along each of the support pillars 10.

The first pulley 41 and the second pulley 42 are each a pulley on which the toothed belt 30 is wound. The first pulley 41 and the second pulley 42 are provided to each of the two support pillars 10. The first pulley 41 is provided to each of the support pillars 10, on one side with respect to the ascending and descending stage 20 in the up-and-down direction. The second pulley 42 is provided to each of the support pillars 10, on the other side with respect to the ascending and descending stage 20 in the up-and-down direction.

Figure 3:
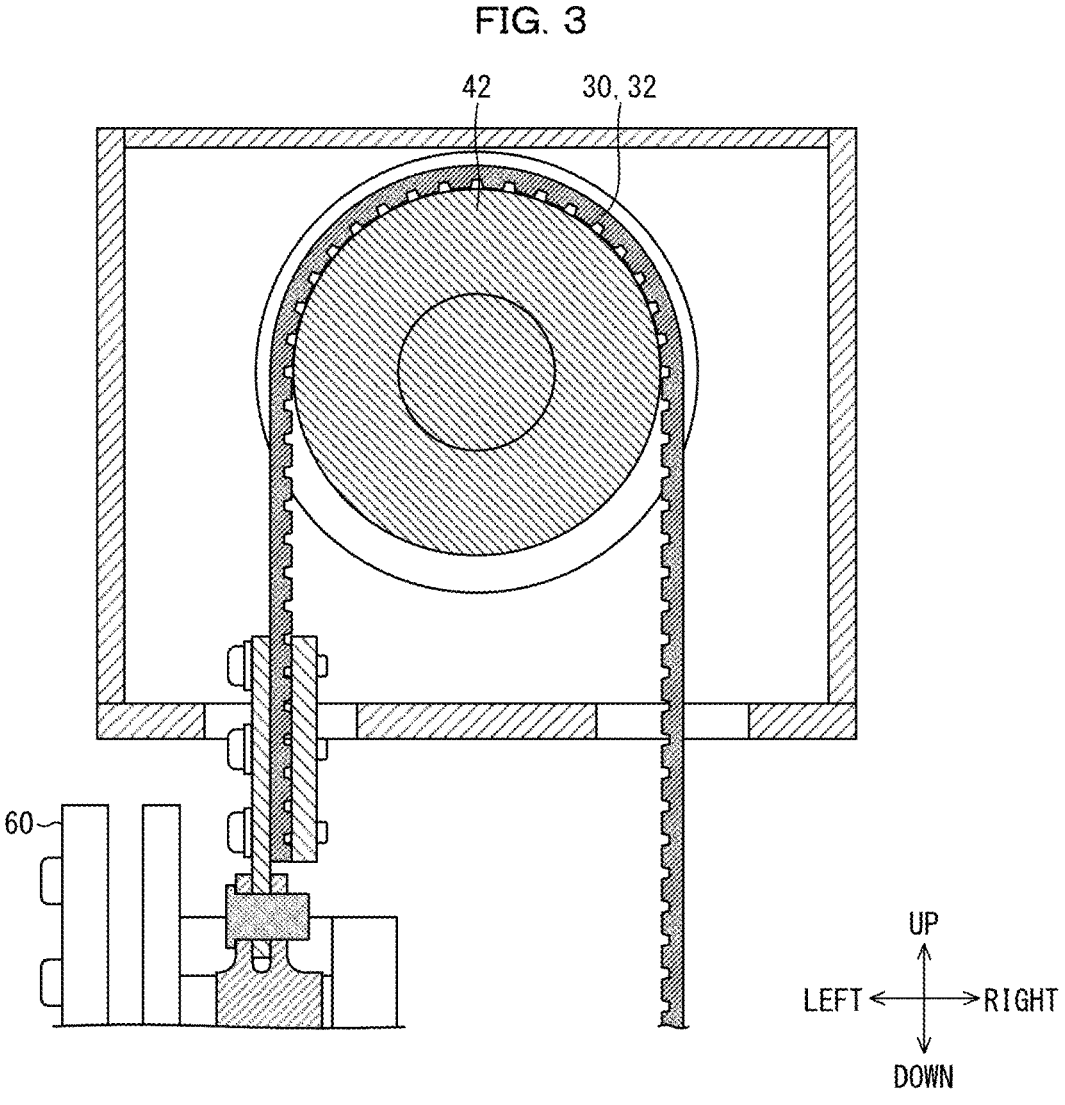
FIG. 3 is a cross-sectional view of the vicinity of a second pulley.

FIG. 2 is a cross-sectional view of the vicinity of the first pulley 41. FIG. 3 is a cross-sectional view of the vicinity of the second pulley 42. As illustrated in FIG. 2, the first pulley 41 is a toothed pulley that meshes with the toothed belt 30. The second pulley 42, however, is a flat pulley as illustrated in FIG. 3.

The drive device 50 drives the first pulley 41 to rotate. The drive device 50 is provided to each of the two support pillars 10. As described above, the first pulley 41 meshes with the toothed belt 30. As such, in conjunction with rotational driving of the first pulley 41 by the drive device 50, the toothed belt 30 is driven, so that the ascending and descending stage 20 ascends and descends along the support pillars 10.

The article conveyance device 1 does not include a drive device that drives the second pulley 42 to rotate. That is, the second pulley 42 is a driven pulley that is rotated by a motive power transmitted from the first pulley 41 via the toothed belt 30. Ad described above, the second pulley 42 is a flat pulley. As such, the second pulley 42 is rotated by friction between the second pulley 42 and tips of teeth of the toothed belt 30.

An area of contact between the second pulley 42, which is a flat pulley, and the toothed belt 30 is smaller than an area of contact between the second pulley 42 and the toothed belt 30 in a case where the second pulley 42 is a toothed pulley that meshes with the teeth of the toothed belt 30. As such, there is less wear of the toothed belt 30 caused by friction between the toothed belt 30 and the second pulley 42. This reduces generation of particles of a material of the toothed belt 30 caused by wear of the toothed belt 30 at the second pulley 42. Further, since the second pulley 42 is a flat pulley, a production cost of the second pulley 42 is reduced in comparison to a case in which the second pulley 42 is a toothed pulley.

In the present embodiment, the first pulley 41 is provided to each of the support pillars 10 on a lower side with respect to the ascending and descending stage 20. In other words, the second pulley 42 is provided to each of the support pillars 10 on an upper side with respect to the ascending and descending stage 20. As such, the reduction in generation of particles at the second pulley 42 also results in reduction of particles falling onto the conveyance target placed on the ascending and descending stage 20.

The counter weight 60 moves along each of the support pillars 10 in a direction opposite to a moving direction of the ascending and descending stage 20 when the ascending and descending stage 20 moves. In the article conveyance device 1, the ascending and descending stage 20, the toothed belt 30, and the counter weight 60 form a closed loop. The ascending and descending stage 20 and the counter weight 60 are located in respective positions opposite to each other in the loop. Note here that the "positions opposite to each other" do not have to be completely precisely opposite to each other, and only need to be positions that can be regarded substantially opposite to each other.

Since the article conveyance device 1 includes the counter weight 60, less energy is required for moving the ascending and descending stage 20, in comparison to a case in which the article conveyance device 1 does not include the counter weight 60. The counter weight 60 has a weight that can be determined as appropriate by a designer of the article conveyance device 1 by taking account of a weight of the ascending and descending stage 20, an assumed weight of a conveyance target, and the like. Note that the counter weight 60 is not essential and can be omitted in the article conveyance device 1.

The toothed belt 30 can include a first toothed belt 31 and a second toothed belt 32. The first toothed belt 31 is wound around the first pulley 41 to connect the ascending and descending stage 20 and the counter weight 60 to each other. The second toothed belt 32 is wound around the second pulley 42 to connect the ascending and descending stage 20 and the counter weight 60 to each other. As described above, in the present embodiment, the first pulley 41 is provided on the lower side with respect to the ascending and descending stage 20, and the second pulley 42 is provided on the upper side with respect to the ascending and descending stage 20. As such, the first toothed belt 31 is stretched downward from the ascending and descending stage 20 along each of the support pillars 10. Further, the second toothed belt 32 is stretched upward from the ascending and descending stage 20 along each of the support pillars 10.

In the article conveyance device 1, since the toothed belt 30 includes the first toothed belt 31 and the second toothed belt 32, each belt has a reduced length in comparison to, for example, a case in which the toothed belt 30 is a single toothed belt. As such, the first toothed belt 31 and the second toothed belt 32 is readily available in comparison to a toothed belt 30 that is a single toothed belt. Further, in a case where one of the first toothed belt 31 and the second toothed belt 32 becomes worn, it is sufficient to replace only the belt that has become worn. This can reduce a cost of maintenance of the article conveyance device 1 in comparison to a case in which the entire toothed belt 30 is replaced.

In the present embodiment, the first toothed belt 31 and the second toothed belt 32 are separate members identical to each other in shape. As such, procurement of parts is easy in comparison to a case in which the first toothed belt 31 and the second toothed belt 32 have respective different shapes.

Note that the first toothed belt 31 and the second toothed belt 32 do not necessarily need to be identical to each other in shape.

Further, if a flat belt is used in place of the second toothed belt 32 that is a toothed belt, it will be necessary to punch holes in the flat belt in order to attach the flat belt to the ascending and descending frame 21 and the counter weight 60. In the article conveyance device 1, the second toothed belt 32 is used, and the ascending and descending frame 21 and the counter weight 60 each have a structure for clamping the second toothed belt 32. This makes it unnecessary to carry out the punching of holes which is required in the case of using a flat belt.

Note, however, that the toothed belt 30 does not necessarily have to include the first toothed belt 31 and the second toothed belt 32, and can be, for example, a single toothed belt. In this case, the counter weight 60 can be attached, for example, by clamping the toothed belt 30 from both sides. (Experimental Example)

The inventor of the present invention made article conveyance devices in accordance with Example and Comparative Example by way of trial, and carried out a test operation. The article conveyance device in accordance with Example included the above-described second pulley 42 being a flat pulley. The article conveyance device in accordance with Comparative Example included, in place of the second pulley 42 being a flat pulley, a toothed pulley which was similar to the first pulley 41 and configured to mesh with the toothed belt 30. In the test operation, the article conveyance devices were each caused to undergo a continuous operation equivalent to 2.5 years of operation, on the assumption that the number of raising and lowering carried out by the article conveyance device per day was 1440 times.

After an end of the test operation, in the article conveyance device in accordance with Comparative Example, particles generated by wear of the toothed belt 30 was observed around the toothed pulley used in place of the second pulley 42. In contrast, in the article conveyance device in accordance with Example, no generation of particles was observed around the second pulley 42. It can therefore be said that in the article conveyance device in accordance with Example, a reduction in production of particles was achieved due to the use of the flat pulley as the second pulley 42, in comparison to the article conveyance device in accordance with Comparative Example.

Generally, a device driven with use of a belt can have a problem that the belt meanders. In the present test operation, however, no significant difference in amount of meandering of the toothed belt 30 was observed between the article conveyance device in accordance with Example and the article conveyance device in accordance with Comparative Example. That is, there was not a problem that the toothed belt 30 of the article conveyance device in accordance with Example had a meandering amount greater than that of the toothed belt 30 of the article conveyance device in accordance with Comparative Example.

Embodiment 2

In the embodiment described above, the first pulley 41 and the drive device 50 are provided to each of the support pillars 10 on a lower side with respect to the ascending and descending stage 20. However, the first pulley 41 and the drive device 50 can be provided to each of the support pillars 10 on an upper side with respect to the ascending and descending stage 20. In other words, the second pulley 42 can be provided to each of the support pillars 10 on a lower side with respect to the ascending and descending stage 20. In this case, too, generation of particles at the second pulley 42 is reduced.

However, unlike the second pulley 42, the first pulley 41 can have generation of particles due to wear of the toothed belt 30 similarly as in a conventional article conveyance device. In a case where the first pulley 41 and the drive device 50 are provided on an upper side with respect to the ascending and descending stage 20, there is a possibility that particles generated at the first pulley 41 fall onto a conveyance target placed on the ascending and descending stage 20. From the viewpoint of reducing particles falling onto the conveyance target, it is preferable that the first pulley 41 and the drive device 50 be provided on a lower side with respect to the ascending and descending stage 20, as described in Embodiment 1.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Article conveyance device
10: Support pillar
20: Ascending and descending stage
30: Toothed belt
31: First toothed belt
32: Second toothed belt
41: First pulley
42: Second pulley
50: Drive device
60: Counter weight

The invention claimed is:

1. An article conveyance device, comprising:

a support pillar having a longitudinal direction corresponding to an up-and-down direction;

an ascending and descending stage provided so as to be movable in the up-and-down direction along the support pillar;

a toothed belt stretched from the ascending and descending stage both upward and downward along the support pillar;

a first pulley provided to the support pillar on one side with respect to the ascending and descending stage in the up-and-down direction, the toothed belt being wound around the first pulley;

a second pulley provided to the support pillar on the other side with respect to the ascending and descending stage in the up-and-down direction, the toothed belt being wound around the second pulley;

a drive device that drives the first pulley to rotate, the first pulley being a toothed pulley that meshes with the toothed belt, the second pulley being a flat pulley; and a counter weight that moves in a direction opposite to a moving direction of the ascending and descending stage when the ascending and descending stage moves, the toothed belt including a first toothed belt that is wound around the first pulley to connect the ascending and descending stage and the counter weight to each other, and a second toothed belt that is wound around the second pulley to connect the ascending and descending stage and the counter weight to each other.

2. The article conveyance device as set forth in claim 1, wherein the first pulley is provided to the support pillar on a lower side with respect to the ascending and descending stage in the up-and-down direction.

* * * * *